Jan. 16, 1962     C. H. WATKINS     3,017,250
CONTINUOUS PROCESS FOR THE PRODUCTION OF HYDROGEN
Filed Sept. 8, 1959
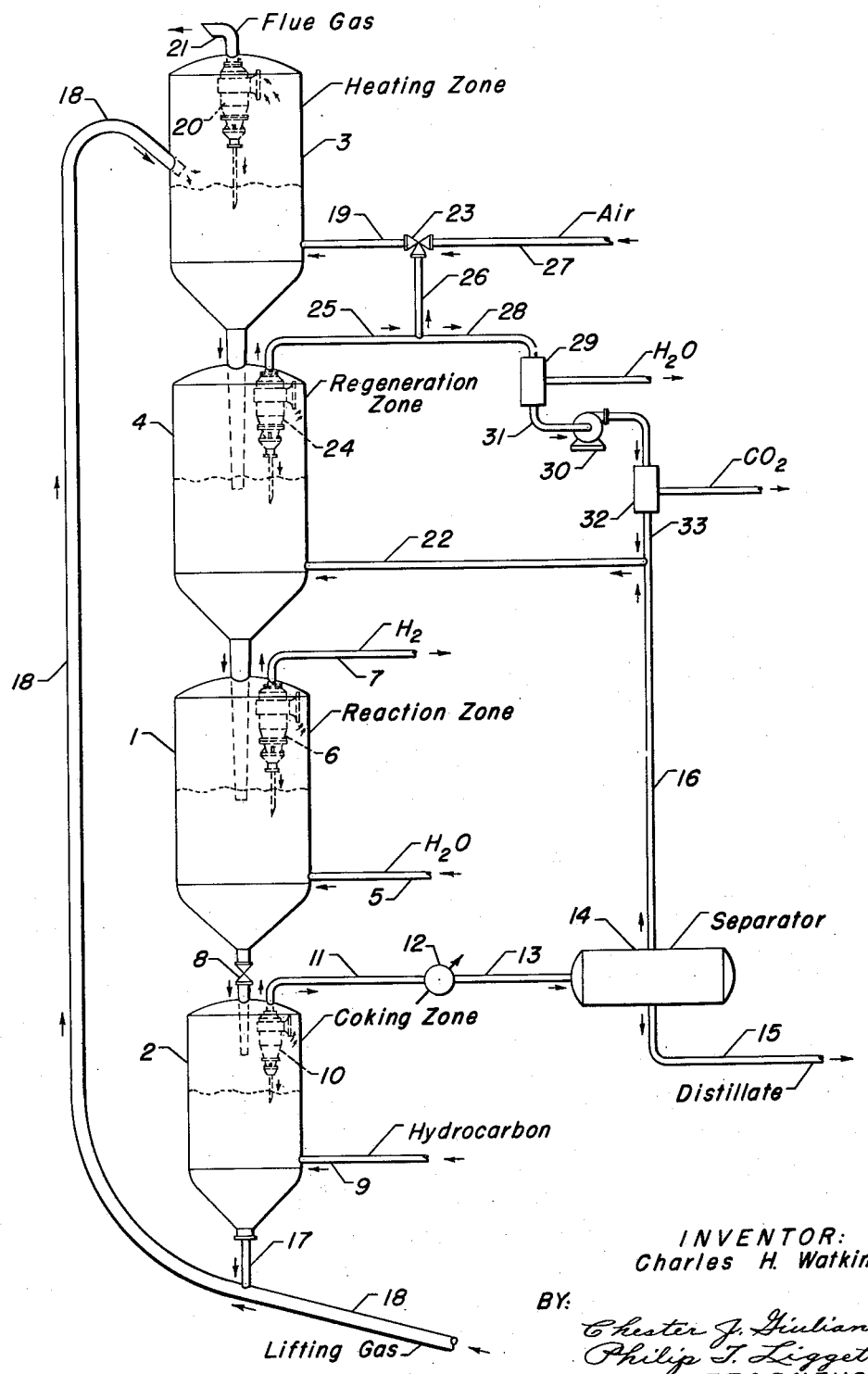
INVENTOR:
Charles H. Watkins
BY:
Chester J. Giuliani
Philip T. Liggett
ATTORNEYS United States Patent Office 3,017,250
Patented Jan. 16, 1962

3,017,250
CONTINUOUS PROCESS FOR THE PRODUCTION
OF HYDROGEN
Charles H. Watkins, Arlington Heights, Ill., assignor to Universal Oil Products Company, Des Plaines, Ill., a corporation of Delaware
Filed Sept. 8, 1959, Ser. No. 838,599
4 Claims. (Cl. 23—214)

The present invention relates to a process for the production of hydrogen. More particularly, it relates to an improved and continuous process for the production of hydrogen in a fluidized solids system wherein hydrogen is produced as a result of the reduction of steam by suitable metals or metal oxides.

Heretofore hydrogen has been produced by the steam-iron process wherein a metal or metal oxide, such as iron or ferrous oxide, is reacted with steam at an elevated temperature with the formation of hydrogen and oxides of iron. The iron oxides are subsequently subjected to a reducing gas thereby preparing the iron for re-use in the process.

In its widest application this process has generally been operated in the cyclic manner. For example, iron-containing material such as chalybite, previously roasted to convert the carbonate to an oxide, is charged to a reactor in a fixed bed and alternately subjected to reduction and oxidation. In the reduction step a reducing gas such as water gas is passed over the iron-containing material. The spent reducing gas is thereafter burned with air above the bed to furnish heat for the process. In the oxidation step steam is passed over the reduced iron-containing material to form oxides of iron and hydrogen. The reduction and oxidation steps of the process are generally followed by a brief air purge to remove any accumulated sulfur compounds and carbon. The presence of sulfur compounds in the bed results from their occurrence in the reducing gas. For the most part they are converted to hydrogen sulfide during the steam cycle and pass out in the hydrogen stream. Carbon formation may result from the decomposition of carbon monoxide and the reducing gas to carbon and carbon dioxide, a reaction catalyzed by iron oxides.

The process above described has a number of recognized disadvantages. For example, it is evident that the amount of metal or metal oxide available for the reduction of steam is dependent upon the efficiency of the reduction step of the process. However, the tendency of the iron to sinter and agglomerate at higher temperatures with the formation of larger particles than are desired results in a decrease in the active surface area of the metal and a utilization of only a small fraction of the iron available for reduction and subsequent oxidation. The efficiency of the process is further hindered by the cyclic procedure required to periodically regenerate the iron-containing materials and to purge the system of sulfur compounds and carbon. Such a system results in undue carbon contamination as well as reduced hydrogen yields.

It is the object of this invention to present a continuous process for the production of substantially pure hydrogen as the result of the reduction of steam by a suitable metal or metal oxide.

It is a further object of this invention to present a continuous process for the production of hydrogen in a fluidized solids system wherein the fluidized solids comprise a metalliferous steam reducing agent.

A more specific object is a continuous process for the production of hydrogen utilizing high molecular weight hydrocarbons to supply heat for the process as well as the reducing gases for the reduction of higher metal oxides to form said metalliferous steam reducing agent.

Further objects and advantages of this invention will become apparent from the following detailed specification.

In its broadest aspect this invention embodies a process for the preparation of hydrogen which comprises charging steam and hot fluidized particles comprising a metalliferous steam reducing agent to a reaction zone, reacting said steam and fluidized particles therein to form hydrogen and fluidized particles comprising an oxide of said metalliferous steam reducing agent, continuously withdrawing hydrogen from said reaction zone, passing said hot fluidized particles and a hydrocarbon to a coking zone, cracking said hydrocarbon therein to form coked fluidized particles and hydrocarbon vapors, passing the hydrocarbon vapors to a separator wherein said vapors are separated into distillate and normally gaseous hydrocarbons and hydrogen, discharging said distillate and utilizing the normally gaseous hydrocarbons and hydrogen as a reducing gas as hereinafter set forth, passing the coke-laden fluidized particles and a combustible gas mixture to a heating zone, said combustible gas mixture comprising an oxygen-containing gas and a spent reducing gas formed as hereinafter set forth, heating said fluidized particles therein to an elevated temperature by burning the coke therefrom in the presence of said combustible gas mixture, passing the resulting hot fluidized particles to a separate regeneration zone maintained at an elevated temperature by the flow of hot fluidized particles therethrough, charging a reducing gas to the regeneration zone, said reducing gas comprising the aforementioned normally gaseous hydrocarbon and hydrogen resulting from the thermal decomposition of the hydrocarbon in the coking zone, passing said reducing gas through said regeneration zone in contact with said hot fluidized particles, withdrawing the spent reducing gas from said regeneration zone, passing the spent reducing gas to a heating zone in combination with an oxygen-containing gas to form the aforementioned combustible gas mixture, recycling excess spent reducing gas through said regeneration zone in combination with the aforesaid normally gaseous hydrocarbon and hydrogen, withdrawing said hot fluidized particles from said regeneration zone and returning said particles to the reaction zone to complete the cycle.

A specific embodiment is in a process for the preparation of hydrogen which comprises charging steam into the lower section of a reaction zone, passing said steam upwardly in contact with a counter-current flow of hot fluidized iron-containing particles, reacting said steam with said fluidized iron-containing particles at a temperature of from about 1100° F. to about 1300° F. to form hydrogen and oxides of said fluidized iron-containing particles, continuously withdrawing hydrogen from the upper section of said reaction zone, passing said fluidized particles downwardly through said reaction zone to the upper section of a coking zone, contacting said fluidized particles therein with a hydrocarbon oil at a temperature of from about 900° F. to about 1100° F., thereby thermally cracking said hydrocarbon oil in said coking zone to form coke-laden fluidized particles and hydrocarbon vapors, passing the hot hydrocarbon vapors through a heat exchanger to a separator wherein the cooled vapors are separated into distillate and normally gaseous hydrocarbons and hydrogen, continuously discharging the distillate, the gaseous phase to be utilized as a reducing gas as hereinafter set forth, passing said coke-laden fluidized particles downwardly through the coking zone and withdrawing said fluidized particles from the bottom thereof, passing said fluidized particles to the upper section of a heating zone and therein contacting said particles with a counter-current flow of a combustible gas mixture comprising air and a spent reducing gas formed as hereinafter described, heating said fluidized particles therein to a temperature of from about 1600° F. to about 1700° F.

by burning the coke therefrom in the presence of said combustible gas mixture, passing the resulting hot fluidized particles downwardly through said heating zone and into a regeneration zone maintained at a temperature of from about 1500° F. to about 1600° F. wherein said fluidized particles are contacted with a counter-current flow of a reducing gas, said reducing gas comprising the aforementioned normally gaseous hydrocarbon and hydrogen resulting from the thermal decomposition of the hydrocarbon oil in the coking zone, passing said reducing gas upwardly through said regeneration zone, withdrawing the spent reducing gas from the upper section of said regeneration zone, passing the spent reducing gas to said heating zone in combination with air to form the aforementioned combustible gas mixture as fuel for the heating process, recycling the excess spent reducing gas through said regeneration zone in combination with freshly introduced reducing gas, withdrawing water and carbon dioxide from the recycle gases during the course of such recycle, passing said fluidized particles downwardly from the regeneration zone to the upper section of the reaction zone and passing the same therethrough in contact with a countercurrent flow of steam to complete the cycle.

To more readily understand the process of the present invention an example of a preferred application has been incorporated in the following detailed description of the process with reference to the attached schematic drawing of the process.

In accordance with the process of this invention steam is charged to the reaction zone 1 through line 5. The steam passes upwardly in contact with a countercurrent flow of hot fluidized particles. Said particles comprise a metalliferous steam reducing agent such as lithium, rubidium, sodium, strontium, barium, calcium, magnesium, beryllium, aluminum, manganese, zinc, chromium, iron, cadmium, cobalt, nickel, tin, lead, copper, etc., or the lower oxides thereof. It is preferred to utilize iron, cobalt, or nickel, or their lower oxides as a metalliferous steam reducing agent. However, it is not intended to thereby limit the process of this invention to the aforementioned metals or their oxides as this process is readily operable with the metalliferous steam reducing agents set out in the broader description above.

Further, it is preferred that said fluidized particles comprise a suitable support, said support serving to minimize agglomeration of the metalliferous steam reducing agent in addition to acting as a heat transfer media. To function satisfactorily in a fluid thermal control process, as employed in the present invention, such support must be resistant to attrition as well as to the thermal shock inherent in such a system. It has been found that a porous, low surface area, refractory metal oxide is best adapted for this purpose. Suitable utilizable refractory metal oxides are such as alumina, silica, zirconia, thoria, boria, etc., or combinations thereof such as silica-alumina, silica-alumina-zirconia, etc. The porosity of the refractory metal oxide should be such that about 20% or more ferrous oxide can be impregnated thereon.

The fluidized particles utilized in the example in these specifications comprises a silica-alumina-zirconia composite impregnated with about 25% by weight of ferrous oxide.

The fluidized, iron-containing particles enter the reaction zone 1 in a reduced state as will be shown hereinafter. Steam charged into the lower section of the reaction zone 1 through line 5 passes upwardly through reaction zone 1 reacting therein with the fluidized iron-containing particles at a temperature of from about 1000° F. to about 1500° F. to form hydrogen and oxides of iron. When operating in a preferred temperature range of from about 1100° to about 1300° F. the mol ratio of steam to hydrogen in the product stream is maintained in excess of 0.5 by regulation of the amount of steam charged to the reactor. In the present example two mols of steam are charged to the reaction zone per mol of hydrogen present in the effluent product stream to maintain a steam-hydrogen mol ratio of about 1.0 in the effluent product stream.

To effect a hydrogen production of 12 MM s.c.f./d., steam is charged to the reaction zone at a rate of about 48,000 pounds per hour while maintaining the reaction zone temperature at about 1300° F. The hydrogen and steam pass upwardly through the reaction zone 1, through a particle separator 6 and exit from the reaction zone via line 7 to be separated and recovered by conventional methods.

The fluidized iron-containing particles pass downwardly through the reaction zone 1 passing therefrom through control valve 8. It is the function of said control valve to regulate the rate of fluidized solids circulation. In this particular example the circulation rate is maintained at about 195 t./hr. The fluidized particles enter the coking zone 2 at a temperature of from about 800° to about 1200° F., and preferably from about 900° to about 1100° F., and are contacted therein with a hydrocarbon charged to said coking zone 2 through line 9.

The hydrocarbon charge of this invention is not restricted to the normally gaseous hydrocarbons such as natural gas, but in addition higher molecular weight hydrocarbons as naphthas, gas oils, kerosenes, crude oils, light vacuum gas oils, heavy vacuum gas oils, coal tars, coal tar distillate fractions, etc., can be utilized. In the present example the hydrocarbon charged according to the process of this invention comprises a vacuum flasher bottoms obtained from a blend of Wyoming-West Texas crude oils having a gravity of approximately 8° API and an IBP of about 950° F. This asphaltic hydrocarbon is charged to the coking zone at a rate of about 19 barrels per hour.

The hydrocarbon charged is thermally decomposed upon contact with hot fluidized particles in the coking zone 2 to form hydrocarbon vapors and coke-laden fluidized particles. In addition, sulfur impurities present in the hydrocarbon charge are converted to metal sulfides and treated in the heating zone 3 as hereinafter set forth. The hydrocarbon vapors pass upwardly through particle separator 10 leaving the coking zone via line 11 passing through a heat exchanger 12 to separator 14 by way of line 13. The cooled hydrocarbon vapors are separated in said separator 14 into gaseous and liquid phases, the distillate to be discharged from the system through line 15, and the gaseous phase passing upwardly through line 16 to be utilized as a reducing gas as hereinafter set forth.

The coke-laden particles pass downwardly through the coking zone 2 passing therefrom by means of line 17 to be transferred to the heating zone 3 through line 18 by means of a lifting gas such as steam or air. The fluidized particles are heated in the heating zone 3 to a temperature of from about 1400° to about 1800° F. or more by burning the coke therefrom in the presence of a combustible fuel mixture supplied to the heating zone 3 through line 19. It is preferred to maintain the temperature of the heating zone 3 in the range of from about 1600° F. to about 1700° F. The resulting flue gas is passed to the particle separator 20 and is expelled from the system through line 21. As a consequence of the heating process the sulfides formed in the coking zone 2 as previously described are converted to sulfur oxides and exit from the system with the flue gas.

The hot fluidized particles pass downwardly through the heating zone 3 and enter the regeneration zone 4 in contact with a counter-current flow of a reducing gas introduced to the regeneration zone 4 through line 22. The regeneration zone is maintained at a temperature of from about 1300° F. to about 1700° F. or more by means of the hot fluidized particles flowing therethrough. Temperatures in the higher range, say from about 1500° F. to about 1600° F. are preferred. The reducing gas utilized according to the process of this invention comprises the normally gaseous hydrocarbons and hydrogen resulting from the thermal decomposition of the hydrocarbon charge in the aforementioned coking zone 2. Fresh reducing gas is introduced to the regeneration zone 4 from line 16 by way of line 22 at a rate such as to maintain at least the necessary requirements of spent reducing gases available at control valve 23 to form the aforementioned combustible fuel mixture as fuel for the heating zone 3 as hereinafter described. In addition said rate should be such as to insure a $CO_2/CO$ ratio below 0.33 as measured in the spent reducing gases. In the present example fresh reducing gas is charged to the regeneration zone 4 via line 22 and line 16 at a rate of about 240 M s.c.f./hr.

The reducing gas passes upwardly through the regeneration zone 4 in contact with the hot fluidized particles, passing through a particle separator 24, and exits from the regeneration zone through line 25. Spent reducing gases pass through line 26 to combine with air introduced through line 27 in a particular ratio determined by the heat requirements of the system and easily ascertained by one skilled in the art. Mixture control valve 23 is so regulated as to maintain the desired temperature in the heating zone 3. The fuel-air mixture so formed enters the heating zone 3 through line 19 to supply heat for the process.

Excess spent reducing gases pass through line 28 to a water condenser 29 wherein water is removed, through a recycle pump 30 by way of line 31, and to a carbon dioxide absorption unit 32. The resulting enriched reducing gases then pass through line 33 to combine with fresh reducing gases charged through line 16. The combined reducing gases then enter the regeneration zone 4 through line 22 to complete a recycle of the excess spent reducing gases. In this manner substantially complete reduction of the fluidized particles is achieved.

The hot fluidized particles pass downwardly from said regeneration zone 4 in a reduced state and enter the reaction zone 1 to contact a counter-current flow of steam and repeat the cycle.

A particular advantage realized in the present process is that readily available hydrocarbon charge stocks can be fully utilized to supply the necessary reducing gases, heat for the process, and a desirable distillate fraction. Further, the improved reduction technique enables the process to be operated at lower temperatures than formerly possible. In addition contamination of the hydrogen product is largely eliminated. Carbon resulting from the thermal decomposition of the hydrocarbon charge stock in the coking zone is converted to oxides of carbon in the heating zone and so discharged with the flue gas. Sulfur contaminants normally introduced with the reducing gases are converted to metal sulfides, and oxidized in the heating zone to be expelled in the flue gas as hydrogen sulfide.

I claim as my invention:

1. A continuous process for the preparation of hydrogen which comprises charging steam and hot fluidized particles comprising a metalliferous steam reducing agent to a reaction zone, reacting said steam and fluidized particles therein to form hydrogen and fluidized particles comprising an oxide of said metalliferous steam reducing agent, continually withdrawing hydrogen from said reaction zone, passing said hot fluidized particles and a hydrocarbon oil to a coking zone, cracking said hydrocarbon oil therein to form coked fluidized particles and hydrocarbon vapors, passing the hydrocarbon vapors to a separator wherein said vapors are separated into distillate and normally gaseous hydrocarbons and hydrogen, discharging said distillate and utilizing the normally gaseous hydrocarbons and hydrogen as a reducing gas as hereinafter set forth, passing the coke-laden fluidized particles and a combustible gas mixture to a heating zone, said combustible gas mixture comprising an oxygen-containing gas and a spent reducing gas formed as hereinafter set forth, heating said fluidized particles therein to an elevated temperature by burning the coke therefrom in the presence of said combustible gas mixture, passing the resulting hot fluidized particles to a separate regeneration zone maintained at an elevated temperature by the flow of hot fluidized particles therethrough, charging a reducing gas to the regeneration zone, said reducing gas comprising the aforementioned normally gaseous hydrocarbons and hydrogen resulting from the thermal decomposition of the hydrocarbon oil in the coking zone, passing said reducing gas through said regeneration zone in contact with said hot fluidized particles, withdrawing the spent reducing gas from said regeneration zone, passing a portion of the spent reducing gas to said heating zone in combination with an oxygen-containing gas to form the aforementioned combustible gas mixture, recycling another portion of the spent reducing gas through said regeneration zone in combination with the aforesaid normally gaseous hydrocarbons and hydrogen, withdrawing said hot fluidized particles from said regeneration zone and returning said particles to the reaction zone to complete the cycle.

2. A continuous process for the preparation of hydrogen which comprises charging steam and hot fluidized particles comprising a metalliferous steam reducing agent impregnated on a porous refractory metal oxide to a reaction zone, reacting said steam and fluidized particles therein to form hydrogen and fluidized particles comprising an oxide of said metalliferous steam reducing agent, continually withdrawing hydrogen from said reaction zone, passing said hot fluidized particles and a hydrocarbon oil to a coking zone, cracking said hydrocarbon oil therein to form coked fluidized particles and hydrocarbon vapors, passing the hydrocarbon vapors to a separator wherein said vapors are separated into distillate and normally gaseous hydrocarbons and hydrogen, discharging said distillate and utilizing the normally gaseous hydrocarbons and hydrogen as a reducing gas as hereinafter set forth, passing the coke-laden fluidized particles and a combustible gas mixture to a heating zone, said combustible gas mixture comprising an oxygen-containing gas and a spent reducing gas formed as hereinafter set forth, heating said fluidized particles therein to an elevated temperature by burning the coke therefrom in the presence of said combustible gas mixture, passing the resulting hot fluidized particles to a separate regeneration zone maintained at an elevated temperature by the flow of hot fluidized particles therethrough, charging a reducing gas to the regeneration zone, said reducing gas comprising the aforementioned normally gaseous hydrocarbons and hydrogen resulting from the thermal decomposition of the hydrocarbon oil in the coking zone, passing said reducing gas through said regeneration zone in contact with said hot fluidized particles, withdrawing the spent reducing gas from said regeneration zone, passing a portion of the spent reducing gas to said heating zone in combination with an oxygen-containing gas to form the aforementioned combustible gas mixture, recycling another portion of the spent reducing gas through said regeneration zone in combination with the aforesaid normally gaseous hydrocarbons and hydrogen, withdrawing said hot fluidized particles from said regeneration zone and returning said particles to the reaction zone to complete the cycle.

3. A continuous process for the preparation of hydrogen which comprises charging steam to the lower section of a reaction zone, passing said steam upwardly in contact with a counter-current flow of hot fluidized particles comprising a metalliferous steam reducing agent, reacting said steam with said fluidized particles at a temperature of from about 1000° F. to about 1500° F. to form hydrogen and fluidized particles comprising oxides of said metalliferous steam reducing agent, continuously withdrawing hydrogen from the upper section of said reaction zone, passing said fluidized particles downwardly through said reaction zone to the upper portion of a coking zone, contacting said fluidized particles therein with a hydrocarbon oil at a temperature of from about 800° F. to about 1200° F. thereby thermally cracking said hydrocarbon oil to form coke-laden fluidized particles and hydrocarbon vapors, passing the hot hydrocarbon vapors through a heat exchanger to a separator wherein the cooled vapors are separated into distillate and normally gaseous hydrocarbons and hydrogen, continuously discharging the distillate, passing said coke-laden fluidized particles downwardly trhough the coking zone and withdrawing said fluidized particles from the bottom thereof, passing said fluidized particles to the upper section of a heating zone and therein contacting said particles with a counter-current flow of a combustible gas mixture comprising an oxygen-containing gas and a spent reducing gas formed as hereinafter described, heating said fluidized particles therein to a temperature of from about 1400° F. to about 1800° F. by burning the coke therefrom in the presence of said combustible gas mixture, passing the resulting hot fluidized particles downwardly through said heating zone and into a regeneration zone maintained at a temperature of from about 1300° F. to about 1700° F. wherein said fluidized particles are contacted with a counter-current flow of a reducing gas, said reducing gas comprising the aforementioned normally gaseous hydrocarbons and hydrogen resulting from the thermal decomposition of the hydrocarbon oil in the coking zone, passing said reducing gas upwardly through said regeneration zone, withdrawing the spent reducing gas from the upper section of said reducing zone, passing the spent reducing gas to said heating zone in combination with an oxygen-containing gas to form the aforementioned combustible gas mixture as fuel for the heating process, recycling another portion of the spent reducing gas to said regeneration zone in combination with freshly introduced reducing gas, withdrawing water and carbon dioxide from the recycle gases during the course of such recycle, passing said fluidized particles downwardly from the regeneration zone to the upper section of the reaction zone and passing the same therethrough in contact with a counter-current flow of steam to complete the cycle.

4. A continuous process for the preparation of hydrogen which comprises charging steam into the lower section of a reaction zone, passing said steam upwardly in contact with a counter-current flow of hot fluidized iron-containing particles, reacting said steam with said fluidized iron containing particles at a temperature of from about 1100° F. to about 1300° F. to form hydrogen and oxides of said fluidized iron-containing particles, continuously withdrawing hydrogen from the upper section of said reaction zone, passing said fluidized particles downwardly through said reaction zone to the upper section of a coking zone, contacting said fluidized particles therein with a hydrocarbon oil at a temperature of from about 900° F. to about 1100° F. thereby thermally cracking said hydrocarbon oil in said coking zone to form coke-laden fluidized particles and hydrocarbon vapors, passing the hot hydrocarbon vapors through a heat exchanger to a separator wherein the cooled vapors are separated into distillate and normally gaseous hydrocarbons and hydrogen, continuously discharging the distillate, passing said coke-laden fluidized particles downwardly through the coking zone and withdrawing said fluidized particles from the bottom thereof, passing said fluidized particles to the upper section of a heating zone and therein contacting said particles with a counter-current flow of a combustible gas mixture comprising air and a spent reducing gas formed as hereinafter described, heating said fluidized particles therein to a temperature of from about 1600° F. to about 1700° F. by burning the coke therefrom in the presence of said combustible gas mixture, passing the resulting hot fluidized particles downwardly through said heating zone and into a regeneration zone maintained at a temperature of from about 1500° F. to about 1600° F. wherein said fluidized particles are contacted with a counter-current flow of a reducing gas, said reducing gas comprising the aforementioned normally gaseous hydrocarbons and hydrogen resulting from the thermal decomposition of the hydrocarbon oil in the coking zone, passing said reducing gas upwardly through said regeneration zone, withdrawing the spent reducing gas from the upper section of said regeneration zone, passing the spent reducing gas to said heating zone in combination with air to form the aforementioned combustible gas mixture as fuel for the heating process, recycling another portion of the spent reducing gas through said regeneration zone in combination with freshly introduced reducing gas, withdrawing water and carbon dioxide from the recycle gases during the course of such recycle, passing said fluidized particles downwardly from the regeneration zone to the upper portion of the reaction zone and passing the same therethrough in contact with a counter-current flow of steam to complete the cycle.

References Cited in the file of this patent
UNITED STATES PATENTS

| | | |
|---|---|---|
| 2,343,780 | Lewis | Mar. 7, 1944 |
| 2,449,635 | Barr | Sept. 21, 1948 |
| 2,888,395 | Henny | May 26, 1959 |